United States Patent [19]
Whitehouse

[11] 3,906,409
[45] Sept. 16, 1975

[54] VARIABLE IMPEDANCE DELAY LINE CORRELATOR

[75] Inventor: Harper John Whitehouse, San Diego, Calif.

[73] Assignee: The United States of America as represented by the Secretary of the Navy, Washington, D.C.

[22] Filed: May 23, 1974

[21] Appl. No.: 472,560

[52] U.S. Cl. .................... 333/29; 235/181; 310/9.8; 333/30 R

[51] Int. Cl.$^2$.. H03H 7/36; H03H 9/30; H03H 9/28; G06F 15/34

[58] Field of Search ......... 333/29, 30 R, 11, 19, 20; 340/174 GB, 174 SG, 174 VB; 310/8.1, 9.8; 235/181

[56] References Cited

UNITED STATES PATENTS

| | | | |
|---|---|---|---|
| 3,715,674 | 2/1973 | Bahr | 333/30 R X |
| 3,816,753 | 6/1974 | Kino | 310/8.1 X |
| 3,826,932 | 7/1974 | Wang | 330/30 R X |
| 3,833,867 | 9/1974 | Solie | 333/30 R |

*Primary Examiner*—James W. Lawrence
*Assistant Examiner*—Marvin Nussbaum
*Attorney, Agent, or Firm*—Richard S. Sciascia; Ervin J. Johnston; John Stan

[57] ABSTRACT

A variable-impedance delay-line correlator comprising a hybrid coupler, having an input port, a common port and an output port, at the input port of which may be applied an arbitrary input signal $X_1(t)$. The correlator includes a variable impedance delay line, whose input is connected to the common port of the hybrid coupler, the delay line also being connectable to an input control signal $X_2(t)$ of variable amplitude, the output of the delay line being terminated in its nominal characteristic impedance $Z_0$. The delay line comprises a set of elements having relative values of reactance such that, with an arbitrary input signal $X_1(t)$ and with the control voltage $X_2(t)$ varying in magnitude and in steps and at uniformly spaced times $\gamma_j$ which satisfy the sampling theorem for $X_2(t)$, the output signal at the output port of the delay line, will be $X_1(t) \otimes (d/dt X_2(t)$, where the symbol $\otimes$ indicates the correlation of the input signal $X_1(t)$ with the derivative of the control signal $X_2(t)$.

6 Claims, 4 Drawing Figures

GENERAL CONFIGURATION OF THE VARIABLE-IMPEDANCE DELAY LINE CORRELATOR.

ELECTRONIC CONFIGURATION OF A VARIABLE-IMPEDANCE DELAY LINE.

VARIABLE-IMPEDANCE DELAY LINE CORRELATOR USING INTERDIGITATED SURFACE-WAVE TRANSDUCERS.

VARIABLE-IMPEDANCE DELAY LINE CORRELATOR USING SURFACE-WAVE AND BULK TYPE TRANSDUCER.

VARIABLE IMPEDANCE DELAY LINE CORRELATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Prior work in the same general area as this invention is described in a paper, entitled "Transformation and Reversal of Time Scale by a Time-Varying Transmission Line," authored by J. B. Gunn, which appeared in ELECTRONICS LETTERS, July 1966, Vol. 2, No. 7. Therein is described the use of a variable impedance delay line for making a time inverter and for making a pulse structure or compressor. In this paper he notes that if a pulse is applied to the variable impedance delay line it will launch a backwards timereversed replica of what was in the delay line at that time, and if there was a corresponding change in the velocity of the delay line at the same time that there was a change in its impedance, the time duration of either the forward transmitted wave or the backwards reflected wave will have its time scale changed, either increasing or decreasing the time scale corresponding to whether the velocity has decreased or increased.

SUMMARY OF THE INVENTION

The invention relates to a variable-impedance delay-line correlator comprising a hybrid coupler, having an input port, a common port and an output port, at the input port of which may be applied an arbitrary input signal $X_1(t)$. A variable impedance delay line has its input connected to the common port of the hybrid coupler, the delay line also being connectable to an input control signal $X_2(t)$ of variable amplitude, the output of the delay line being terminated in its nominal characteristic impedance $Z_0$. The delay line comprises a set of elements having relative values of reactance such that, with an arbitrary input signal $X_1(t)$ and with the control signal $X_2(t)$ varying in magnitude and in steps and at uniformly spaced times $\gamma_j$ which satisfy the sampling theorem for $X_2(t)$, the output signal at the output port of the delay line will be $X_1(t) \otimes (d/dt)\, X_2(t)$, where the symbol $\otimes$ indicates the correlation of the input signal $X_1(t)$ with the derivative of the control signal $X_2(t)$.

OBJECTS OF THE INVENTION

An object of the invention is to provide a variableimpedance delay-line correlator capable of many types of implementation, inductance-capacitance, surface-wave piezo-electric device, or a bulk-wave device, or using other types of parameters.

Yet another object of the invention is to provide a delayline correlator using low-pass filter capable of decoding the output signal into its components.

Other objects, advantages and novel features of the invention will become apparent from the following detailed description of the invention, when considered in conjunction with the accompanying drawings, wherein:

DESCRIPTION OF THE PREFERRED EMBODIMENTS

Figure 1:
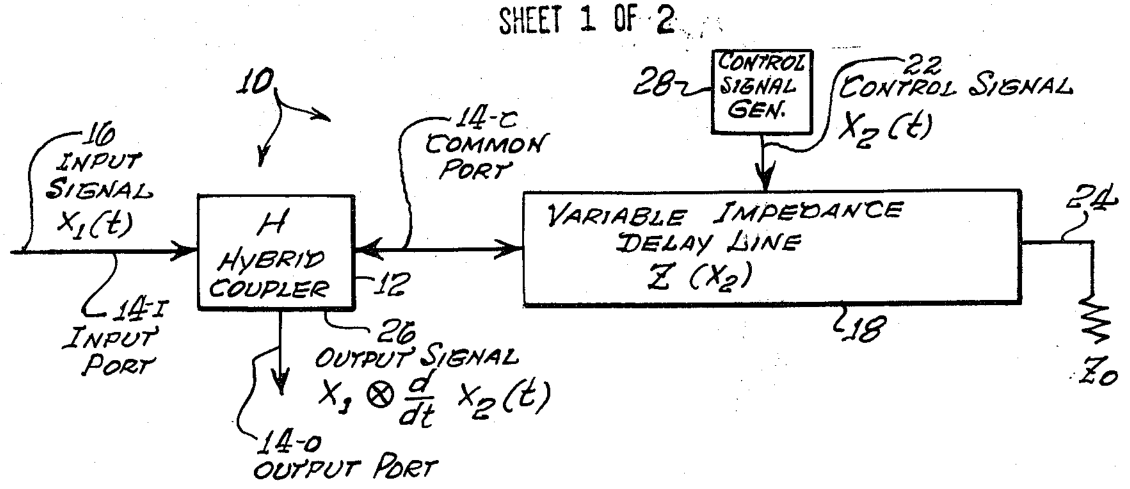
FIG. 1 is a block diagram of a general configuration of the variable-impedance delay-line correlator.

Referring now to the figures, FIG. 1 illustrates a variable-impedance delay-line correlator 10 comprising a hybrid coupler 12, having an input port 14-I, a common port 14-C and an output port 14-0, at the input port of which may be applied an arbitrary input signal $X_1(t)$, labeled 16. A circulator may also be used instead of the hybrid coupler 12.

A variable impedance delay line 18 has its input connected to the common port 14-C of the hybrid coupler 12, the delay line also being connectable to an input control signal $X_2(t)$, labeled 22, of variable amplitude, the output 24 of the delay line being terminated in its nominal characteristic impedance $Z_0$. Generally speaking, the delay line 18 comprises a set of elements having relative values of reactance such that, with an arbitrary input signal $X_1(t)$ at input port 14-I and with the control signal voltage $X_2(t)$ 22, varying in magnitude and in steps and at uniformly spaced times $\gamma_j$ which satisfy the sampling theorem for $X_2(t)$, the output signal 26 at the output port 14-0 of the delay line, will be $X_1(t) \otimes (d/dt)\, X_2(t)$, where the symbol $\otimes$ indicates the correlation of the input signal $X_1(t)$ with the derivative of the control signal $X_2(t)$.

The variable-impedance delay-line correlator 10 may comprise the means 28 for generating the control signal 22 voltage connected to the variable impedance delay line 18.

Figure 2:
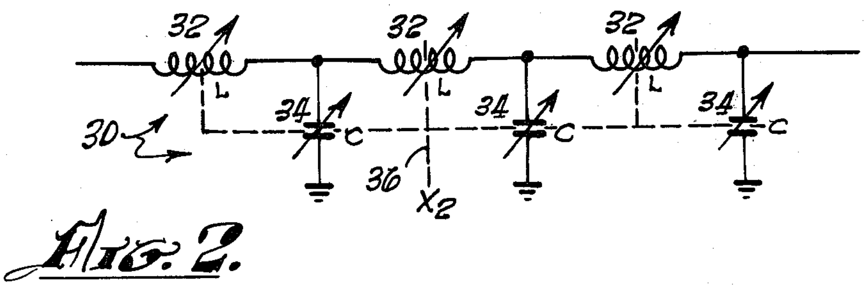
FIG. 2 is a schematic diagram of an electronic configuration of a variable-impedance delay line.

In a specific embodiment, as is shown in FIG. 2, the variable-impedance delay line 30 may comprise a ladder network of variable series inductors 32 and variable parallel capacitors 34.

The inductors 32 and the capacitors 34 of the distributed delay line 30 define an impedance for the delay line. This impedance involves an expression involving the magnitude of the inductances 32 and the capacitors 34.

In particular, therefore, one of the signals is applied as the control signal which moves all of the L's, 32, and the C's, 34, at the same time, and this becomes the control signal $X_2$, 36. There are many delay lines which have been built which have saturable inductors and varicaps, which were made as variable velocity delay lines, for which only a minor reconfiguration is required in order to convert these into variable-impedance lines. Ideally, it is desired to have a delay line whose impedance changes but whose velocity remains fixed, because it is not essential for the operation of the device, and it simplifies the understanding of the device, that the velocity remain constant while the impedance is changing. Since there is a different expression involving the L's and C's for velocity as a parameter, than the one for impedance as a parameter, it is within the state of technology to design such a line if it were required.

Figure 4:
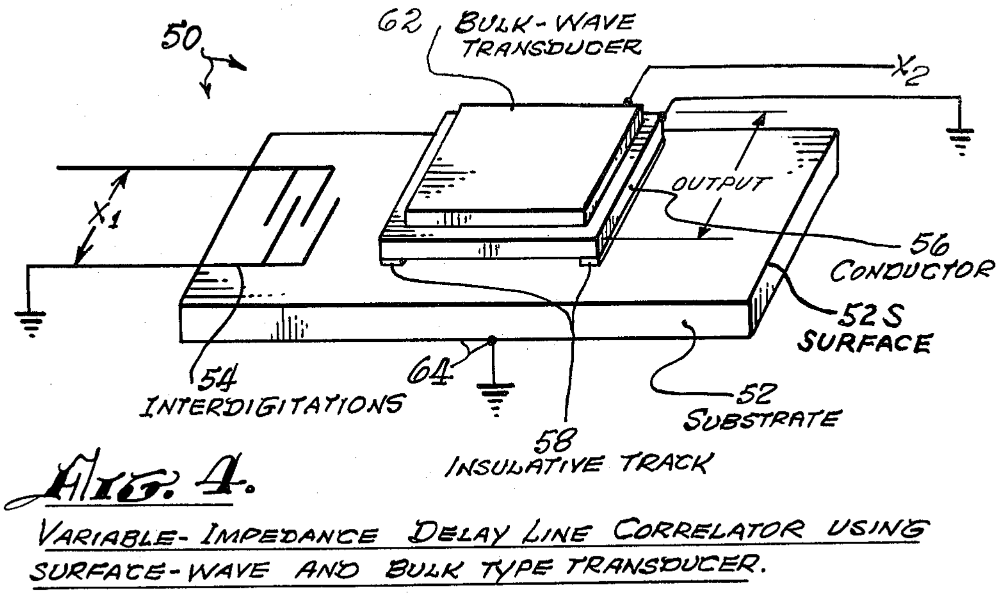
FIG. 4 is a diagrammatic view of a variable-impedance delay-line correlator utilizing a surface-wave and bulk-type transducer.

Referring now to FIG. 4, this figure illustrates a variable-impedance delay-line correlator 50, wherein the hybrid coupler comprises a set of interdigitated electrodes 54, disposed upon a substrate 52, at the input port of which the arbitrary input signal $X_1(t)$ may be applied.

The variable impedance line 50 comprises a relatively thin, generally rectangular, conductive plate 56, disposed parallel to the substrate 52 to one side of the interdigitated electrodes 54. Means 58 are provided for separating the conductive plate 56 from the substrate 52. Means 62 are also provided for impressing the $X_2(t)$ signal broadside to the conductive plate 56. A conductive sheet 64 is disposed upon the substrate 52 on the opposite side from the separating means 58. The signal $X_2(t)$ is impressed between the signal impressing means 62 and the conductive sheet 64, thereby stressing the crystal 52, the stress in the crystal causing changes in the elastic propagation constants, which cause the change in the impedance.

As is shown in FIG. 4, the separating means comprises two narrow rails 64 disposed beneath and on each end of the conductive plate 56, the rails comprising an insulating material, for example silicon dioxide. A specific implementation of the signal impressing means comprises a bulk-wave transducer 62.

To insure uniform separation, a number of techniques have been used. Dielectric films have been deposited as rails 58, as is shown in FIG. 4. Another technique which has been used is to put a number of small posts on the top surface and to simply press the conductor 56 directly onto the surface, having it supported by the small posts much like a pier in the ocean is supported by a set of pilings uniformly underneath it. Just as an ocean wave is able to run underneath the pilings of a pier, so the acoustic wave can run underneath a small number of posts which are disposed upon the surface of the crystal.

The smaller the number of rails 58 the better the performance, the larger the number, the more uniform the gap between the bottom surface of the conductor 56 and the surface 52S.

A low-pass filter may be used with the variable-impedance delay-line correlator, having a response (sin $x/x$) and a first zero at $f = (1/\gamma)$, which is capable of reconstructing the output signal $X_1(t) \otimes (d/dt)\, X_2(t)$ into its components $X_1(t)$ and $X_2(t)$. The low-pass filter would be connected at the output port 14-0 of the hybrid coupler 12. This reconstruction is possible because in all sample data systems which are described on the basis of the behavior of the system per a discrete number of samples taken at the Nyquist rate, the corresponding continuous output may be obtained from the sample output by passing it through a reconstruction filter of the form (sin $x/x$). This is a well known result, which permits both sample data cross-correlation and continuous crosscorrelation through use of the (sin $x/x$) interpolating filter.

Discussing the theory behind the invention, and referring again to FIG. 1, an arbitrary signal $X_1(t)$ labeled 16, is applied to the input port 14-I of a hybrid coupler 12 whose common port 14-C is connected to a variable impedance delay line 18, which is terminated in its nominal characteristic impedance $Z_o$, labeled 24. At the output port 14-0 the correlation of the input signal $X_1(t)$ with the time derivative $(d/dt)\, X_2(t)$ of the control signal $X_2(t)$, labeled 22, takes place.

The operation is as follows. Consider a time when the signal $X_1(t)$ is entirely within the delay line 18. Let a step change in control voltage $X_2$ be $\Delta(T_1)$ at a time $T_1$, then the signal $X_2(t)$ is reflected uniformly in the delay line 18 with strength $\Delta(T_1)$. At a time $T_2$ another step change in control signal $X_2(t)$ is made of magnitude $\Delta(T_2)$. This also reflects uniformly in the line 18 a replica of the signal with strength $\Delta(T_2)$. Since the device 18 is linear, in the propagation of the signal the two reflected signals add, delayed by the amount $T_2 - T_1$. If this process is continued indefinitely at the interval $T_j - T_{j-1} = T_2 - T_1 = T$, then propagation in the delay line 18 is a superposition of delayed and weighted copies of $X_1$ with weights $\Delta_j$ at times $T_j$. This is by definition the cross-correlation of $X_2(t)$ with the sample signal $\Delta_j z^j$. This signal is separated from the input signal 16 by the action of the hybrid coupler 12, and appears as the output signal 14-0.

If the times $T_j$ satisfy the sampling theorem for $X_2(t)$, then a low-pass filter with response $(\sin x/x)$ and first zero at $f = (1/T$ will reconstruct the output signal $X_1(t) \otimes (d/dt\, X_2(t)$.

The variable impedance feature is the mechanism which makes the invention work. The variable impedance gives rise to the refraction. The refracted wave from any discontinuity in the wave guide is a function of the impedance discontinuity which occurs in the wave guiding medium. If there were no variable impedance, particularly in the variable impedance under electronic control, there would therefore be no cross-correlation. The variable impedance is the key element which makes the cross-correlation feasible.

The derivative is involved in the correlation process because the scattering of the signal in the variable delay line is proportional to the derivative of the signal applied to the delay line, so that it becomes the cross-correlation of the signal in the delay line and the derivative of the signal applied to the delay line that are involved, because it is only a change in the impedance of the delay line that produces a backward signal. So instead of getting the output for an arbitrary signal applied to the delay line, which is controlling the impedance, it is only whenever the impedance changes that some of the input signal $X_1$ is reflected back. Therefore, the superposition of a large number of reflected versions of $X_1$ at all of the discontinuities of derivatives of $X_2$ takes place, hence, the correlation with the derivative of $X_2$.

The signal $X_2$ may be any arbitrary signal applied to the control port 22 of the variable impedance delay line 18. It could be a sequence of pulses, it could be an analog signal.

As described hereinabove in connection with FIG. 2, one possible implementation is a discrete component delay line 30 with variable inductors 32 and capacitors 34. In this configuration, the current through the inductors 32 and the voltage across the capacitors 34 are both proportional to the control signal $X_2(t)$.

This correlation process can be accomplished through the use of voltage-variable capacitors 34 and saturable inductors 32 since the velocity of propagation is $v \propto \sqrt{1/LC}$ and the characteristic impedance is $Z = \sqrt{L/C}$. If the inductance L increases as the capacitance C decreases, $v$ = constant and $Z = k\sqrt{(L/C)(1 + \Delta L \Delta C)}$, which for $\Delta L \Delta C << 1$ is $Z = K\sqrt{(L/C)}(1 + \Delta L \Delta C/2)$. Since voltage-variable capacitors can be made such that $\Delta C \sim \epsilon^{1/2}$ when $\epsilon$ is the applied voltage and saturable inductors can be constructed also such that $\Delta L \sim \Delta I$ when $E = IR$, then for small changes in the control signal $X_2(t)$, $\Delta Z = k_1\Delta\epsilon_j$ and $\Delta v = k_2$.

Figure 3:
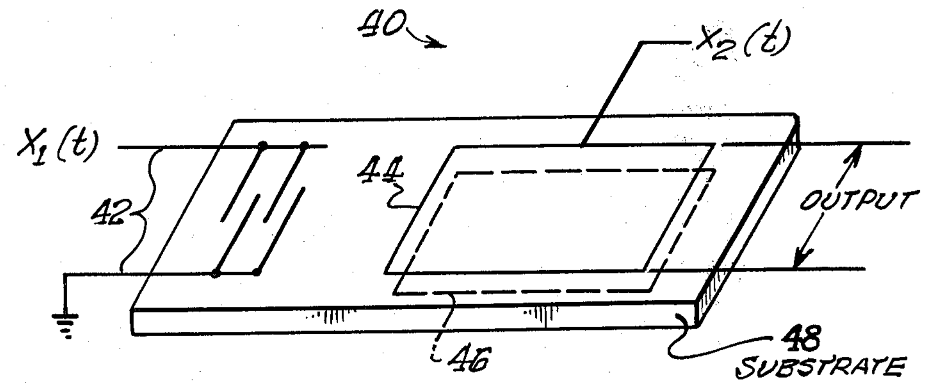
FIG. 3. (PRIOR ART)
FIG. 3 is a diagrammatic view of a prior art variable-impedance delay line correlator using an interdigitated surface wave transducer.

Another implementation is with solid state acoustic devices, as shown in FIGS. 3 and 4. Let the modulus m controlling the propagation of the elastic waves be dependent on an external parameter, i.e., current for a magnetic propagation material, voltage for a nonmagnetic dielectric material. Since $v = \sqrt{m/\rho}$ and $Z = f(m)$, then the device operates essentially as previously described. However, there is a second order effect caused by the variation of the velocity of propagation. If $(\Delta v/v)$ is small, this may usually be ignored. A particularly convenient form of this device is shown in FIG. 3 where the delay medium is a piezoelectric surface wave device 40 with interdigital transducer 42 and the control signal is applied across electrodes 44 and 46 on the major faces of the device.

Since the variation of modulus with control parameter is generally not known for new materials, a selection procedure is needed before evaluating new materials. It is to be noted that variation of impedance Z is often accomplished by variation of velocity v. It is also to be noted that materials which have a large $(\Delta v/v)$ are required. Such a phenomenon occurs in a conductively stiffened piezoelectric. This suggests the third device implementation 50, as shown in FIG. 4. Here a conductor 56 is positioned a small distance above a strongly piezoelectric surface 52S of the substrate 52. A bulk wave transducer 62 varies the spacing between conductor 56 and the surface 52S, and induces velocity charges in the wave propagating in substrate 52. Corresponding changes in impedance must occur.

Additional implementations, not shown, result from stressinduced changes in the index of refraction of a device in which an optical wave is propagating, and variation in the magnetic properties of a device in which magnetic waves are propagating. Other devices are possible where the control phenomenon is thermal variation of the modulus, variation of the dielectric constant or magnetic susceptibility. In fact any device where there is a "wave" propagating in a medium whose wave impedance is a function of some other parameter may be used in this mode.

Obviously, many modifications and variations of the present invention are possible in the light of the above teachings. It is therefore to be understood that within the scope of the appended claims the invention may be practiced otherwise than as specifically described.

What is claimed is:

1. A variable-impedance delay-line correlator comprising:

a hybrid coupler, having an input port, a common port and an output port, at the input port of which may be applied an arbitrary input signal $X_1(t)$;

a variable impedance delay line, whose input is connected to the common port of the hybrid coupler, the delay line also being connectable to an input control signal $X_2(t)$ of variable amplitude, the output of the delay line being terminated in its nominal characteristic impedance $Z_0$;

the delay line comprising a set of elements having relative values of reactance such that, with an arbitrary input signal $X_1(t)$ and with the control signal $X_2(t)$ varying in magnitude and in steps and at uniformly spaced times $Y_j$ which satisfy the sampling theorem for $X_2(t)$, the output signal at the output port of the delay line will be $X_1(t) \otimes (d/dt)\, X_2(t)$, where the symbol $\otimes$ indicates the correlation of the input signal $X_1(t)$ with the derivative of the control signal $X_2(t)$.

2. The variable-impedance delay-line correlator of claim 1, including a low pass filter having a response $(\sin x/x)$ and a first zero at $f = (1/\gamma)$, capable of reconstructing the output signal $X_i(t) \otimes d/dt\, X_2(t)$ into its components $X_1(t)$ and $X_2(t)$.

3. A variable-impedance delay-line correlator according to claim 1, further comprising:

means connected to the variable impedance delay line for generating the control signal.

4. A variable-impedance delay-line correlator according to claim 3, wherein the variable-impedance delay line comprises a ladder network of variable series inductors and variable parallel capacitors; and means for simultaneously varying the inductance of each inductor and the capacitance of each capacitor corresponding to the variation of the signal $X_2(t)$;

the inductors and capacitors having relative values of reactance such that, in operation, the current through the inductors and the voltage across the capacitors are both proportional to the signal $X_2(t)$.

5. A variable-impedance delay-line correlator according to claim 1, wherein the hybrid coupler comprises:

a set of interdigitated electrodes, disposed upon a substrate, which comprise the input port at which the arbitrary input signal $X_1(t)$ may be applied:

the variable impedance line comprises:

a relatively thin, generally rectangular, conductive plate disposed parallel to the substrate to one side of the interdigitated electrodes;

means for separating the conductive plate from the substrate;

means for impressing the $X_2(t)$ signal broadside to the conductive plate; and a conductive sheet disposed upon the substrate on the opposite side from the separating means;

the signal $X_2(t)$ being impressed between the signal impressing means and the conductive sheet.

6. The correlator according to claim 5, wherein the separating means comprises two narrow rails disposed on each side of the conductive plate, the rails comprising an insulating material, for example silicon dioxide; and the signal impressing means comprises a bulk-wave transducer.

* * * * *